United States Patent [19]

Kataoka et al.

[11] Patent Number: 5,223,758
[45] Date of Patent: Jun. 29, 1993

[54] SPINDLE MOTOR

[75] Inventors: Takashi Kataoka; Yuji Shirao; Daisuke Konno; Yoshio Sato; Yoichi Kanemitsu; Hideo Tsuboi, all of Kanagawa; Shunichi Aiyoshizawa, Tokyo; Kazuyuki Kasahara, Kanagawa, all of Japan

[73] Assignee: Ebara Corporation, Tokyo, Japan

[21] Appl. No.: 665,213

[22] Filed: Mar. 5, 1991

[30] Foreign Application Priority Data

Mar. 5, 1990 [JP] Japan .................................. 2-54579

[51] Int. Cl.$^5$ .................... H02K 7/08; H02K 7/09; F16C 23/00
[52] U.S. Cl. .................... 310/90; 310/67 R; 310/90.5; 384/248
[58] Field of Search ............ 510/67 R, 90, 90.5; 384/100, 101, 102, 121, 248, 446

[56] References Cited

FOREIGN PATENT DOCUMENTS

| | | |
|---|---|---|
| 2309754 | 5/1976 | France . |
| 59-28757 | 2/1984 | Japan . |
| 61-266044 | 11/1986 | Japan . |
| 63-87162 | 4/1988 | Japan . |
| 63-100416 | 5/1988 | Japan . |
| 63-241515 | 10/1988 | Japan . |
| 63-241516 | 10/1988 | Japan . |
| 63-241517 | 10/1988 | Japan . |
| 1524662 | 9/1978 | United Kingdom . |

OTHER PUBLICATIONS

Patent Abstracts of Japan, vol. 13, No. 490 (E-841)(3838), Nov. 7, 1989.
Patent Abstracts of Japan, vol. 11, No. 119 (E-499)(2566), Apr. 14, 1987.
Patent Abstracts of Japan, vol. 4, No. 137 (E-27)(619), Sep. 25, 1980.
Design of Gas Bearings, vol. I, pp. 6.1.21–6.1.42.
Design of Gas Bearings, vol. II, pp. 6.3.1–6.3.24.
Ebara Engineering Review, No. 143, Apr. 1989, pp. 16–20.
Journal of Japanese Society of Tribologists, vol. 34, No. 2, Feb. 15, 1989, pp. 49–52.

Primary Examiner—Steven L. Stephan
Assistant Examiner—C. LaBalle
Attorney, Agent, or Firm—Wenderoth, Lind & Ponack

[57] ABSTRACT

A spindle motor has a rotor supported by a stator through a thrust bearing and a radial bearing. At least the thrust bearing is a hydrodynamic bearing. The spindle motor is provided with a device for adjusting the thrust laod that is applied to the thrust bearing. The load adjusting device has an electromagnet that is provided on the stator and a permanent magnet that is provided on the rotor in opposing relation to the electromagnet. Either the repelling force or the attraction force, which acts between the electromagnet and the permanent magnet, is controlled by changing the current supplied to the electromagnet.

9 Claims, 4 Drawing Sheets

SPINDLE MOTOR

BACKGROUND OF THE INVENTION

The present invention relates to a spindle motor which may be employed to drive, for example, a movable part of office automation equipment. More particularly, the present invention relates to a spindle motor which has high rigidity and a long lifetime.

With the achievement of hard disk drives having a high storage capacity and low power consumption, demand has been made for improvements in the performance of the spindle motors used to drive the hard disks. For example, spindle motors having a high rigidity and a long life have been demanded.

Conventional spindle motors of the type described above generally employ ball bearings. Ball bearings involve fundamental problems, such that they require lubrication by means of grease, and that it is difficult to improve the rotational accuracy and extend the lifetime thereof because the amount of axial vibration produced during rotation is relatively large. In order to solve these problems, employment of hydrodynamic bearings in place of ball bearings has been proposed.

FIG. 5 is a sectional view of a spindle motor employing hydrodynamic bearings, which was filed by the same applicant prior to this application (Japanese Patent Application No. 01-179647). As illustrated, this spindle motor comprises a motor stator 1 and a motor rotor 6.

The motor stator 1 comprises a base 2, a support shaft 3 that stands on the central portion of the base 2, a thrust bearing pad 4 that is secured to the base 2 and an annular radial bearing member 8 that is concentrically secured to the support shaft 3, and a stator 11 of a driving motor 5 secured to the support shaft 3 below the radial bearing member 8. A motor rotor 6 comprises a radial shaft sleeve 7 and a rotor 10 in the driving motor 5 secured inside a cylindrical member such that the radial shaft sleeve 7 faces the radial bearing member 8 and the rotor 10 faces the stator 11, together with a thrust bearing collar 9 that is secured to the lower end of the cylindrical member in opposing relation to the thrust bearing pad 4. The radial shaft sleeve 7 and the radial bearing member 8 face each other to form a herringbone groove hydrodynamic radial bearing, as shown in FIG. 6. The surface of the radial bearing member 8 that faces the radial shaft sleeve 7 is formed with grooves for generating dynamic pressure, for example, herringbone-shaped grooves $C_1$.

The thrust bearing pad 4 and the thrust bearing collar 9 face each other to form a spiral groove hydrodynamic thrust bearing 12. The surface of the thrust bearing pad 4 that faces the thrust bearing collar 9 is formed with grooves for generating dynamic pressure, for example, spiral grooves $C_2$ shown in FIG. 7.

The conventional spindle motor having the above-described arrangement suffers, however, from problems stated below. Hydrodynamic bearings, particularly hydrodynamic thrust bearings, need large starting torque because of the large contact resistance at the time of starting and are, in many cases, required to have excessive motor performance. When the number of revolutions increases, the thickness of the fluid layer in a hydrodynamic bearing increases, resulting in a lowering in the rotational rigidity. As a result, the axis of the rotor is inclined with respect to the support shaft, which leads to an increase in the starting torque because of local contact of the dynamic pressure surfaces. In addition, whirling of the shaft makes it impossible to obtain a satisfactory operating condition.

SUMMARY OF THE INVENTION

In view of the above-described circumstances, it is an object of the present invention to provide a spindle motor of high rigidity and long life which is designed so that the starting torque of a hydrodynamic thrust bearing is minimized and the rotational stability during high-speed rotation is enhanced.

To this end, the present invention provides a spindle motor having a motor stator, a motor rotor, and a driving motor having a stator secured to the motor stator and a rotor secured to the motor rotor, motor rotor being rotatably supported by the motor stator through a thrust bearing and a radial bearing, of which at least the thrust bearing is a hydrodynamic bearing. The improvement comprises a thrust load adjusting device which has an electromagnet that is provided on the motor stator and a permanent magnet that is provided on the motor rotor in opposing relation to the electromagnet to adjust the thrust load applied to the thrust bearing by controlling the current that is supplied to the electromagnet and thereby controlling the repelling force and/or attraction force that acts between the electromagnet and the permanent magnet.

The current supplied to the electromagnet of the thrust load adjusting device may be controlled in accordance with the current that is supplied to the driving motor.

The value of current supplied to the electromagnet of the thrust load adjusting device may be controlled in accordance with the value of current supplied to the driving motor when started.

The present invention may be arranged such that, when the rotational speed of the driving motor reaches a predetermined value, the polarity of the electromagnet of the thrust load adjusting device is reversed to increase the force that is applied to the thrust bearing.

By virtue of the above-described arrangement, an attraction force and/or repelling force acts between the permanent magnet and the electromagnet, and when the driving motor is started, the polarity of the electromagnet is set in a direction in which the thrust load is reduced, thereby reducing the thrust load at the time of starting the motor.

Since the thrust load can be controlled by varying the current, it is possible to provide a fluid layer thickness which is sufficient to prevent solid contact between the constituent elements of the hydrodynamic thrust bearing and maintain the required rotational stability.

When the rotational speed of the motor rotor increases, the hydrodynamic pressure increases and the thickness of the fluid layer increases excessively, resulting in a lowering in the rotational stability. However, if the polarity of the electromagnet is made reverse to that employed at the time of starting the motor, the thrust load increases and the thickness of the fluid layer becomes sufficient to maintain the required rotational stability.

DETAILED DESCRIPTION OF THE PREFERRED EMBODIMENT

A preferred embodiment of the present invention will be described below in detail with reference to the accompanying drawings.

Figure 1:
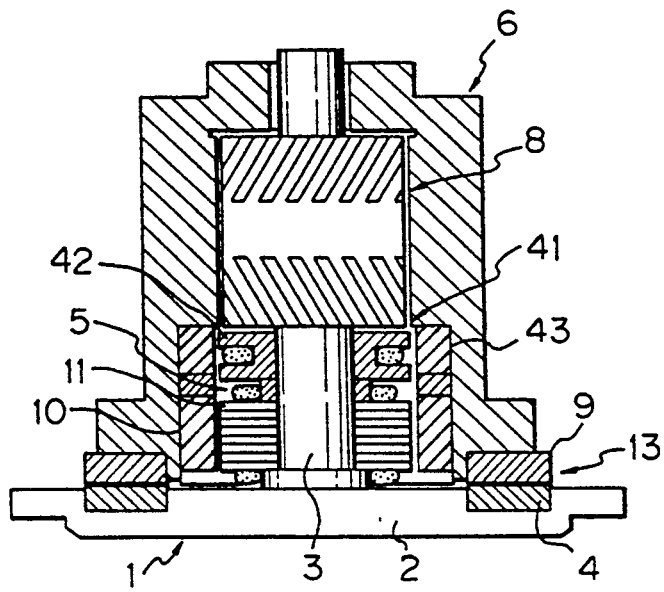
FIG. 1 is a sectional view showing the structure of one embodiment of a spindle motor according to the present invention.
Figure 5:
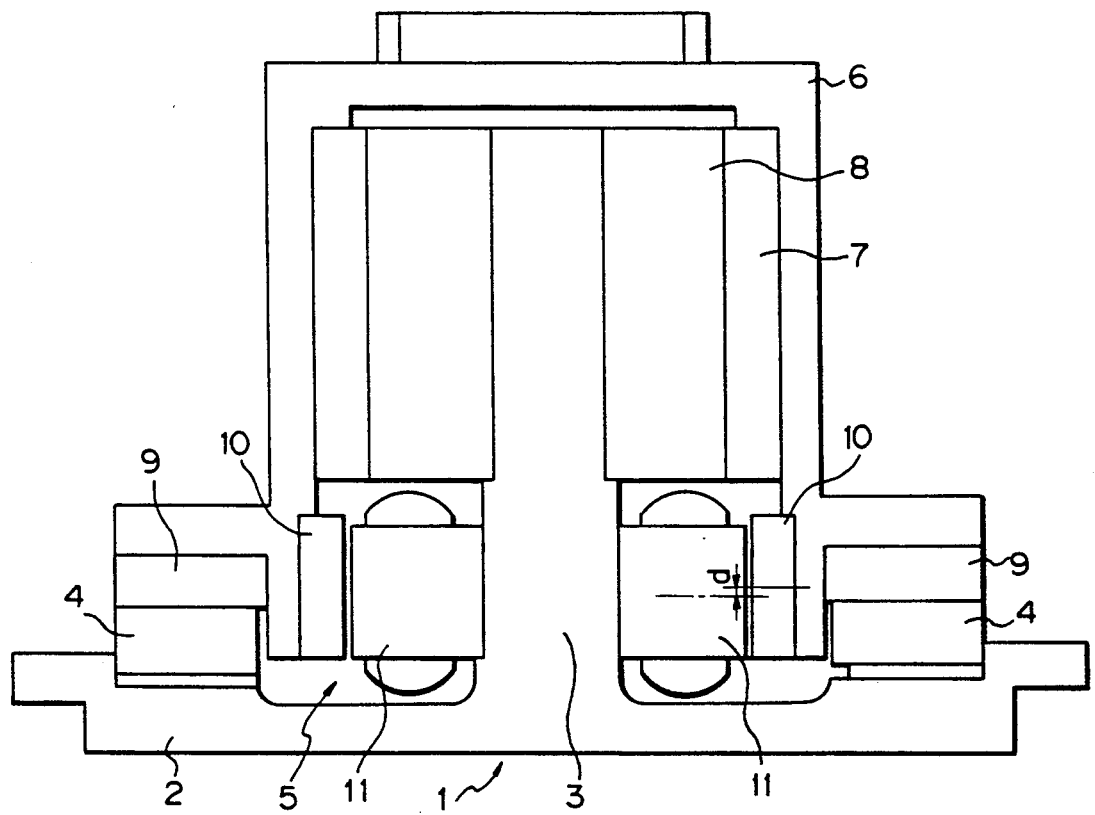
FIG. 5 is a sectional view showing the structure of a conventional spindle motor.

FIG. 1 is a sectional view showing the structure of one embodiment of the spindle motor according to the present invention. The spindle motor of this embodiment is a so-called outer rotor type motor, which comprises a motor stator 1 and a motor rotor 6, and in which a support shaft 3 of the stator 1 is stationary and the cylindrical rotor 6, which is outside the support shaft 3, rotates. In FIG. 1, the same reference numerals as those in FIG. 5 denote the same or equivalent elements.

Figure 6:
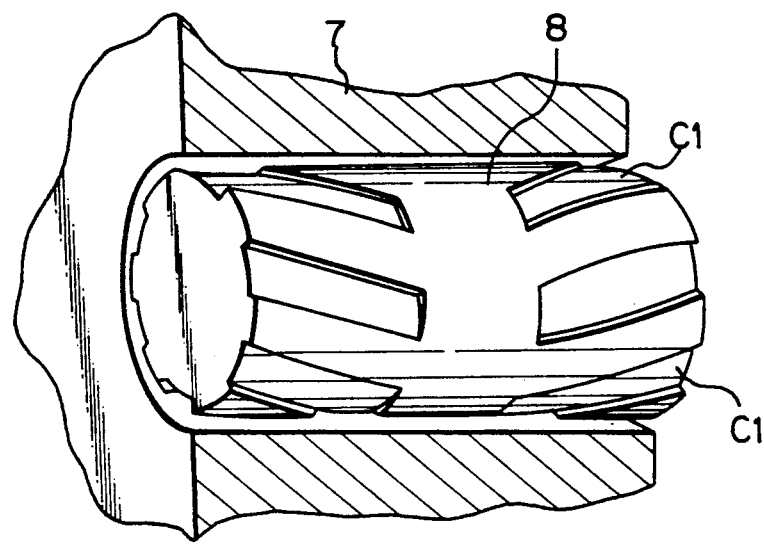
FIG. 6 shows an example of dynamic pressure generating grooves formed in a radial bearing member.
Figure 7:
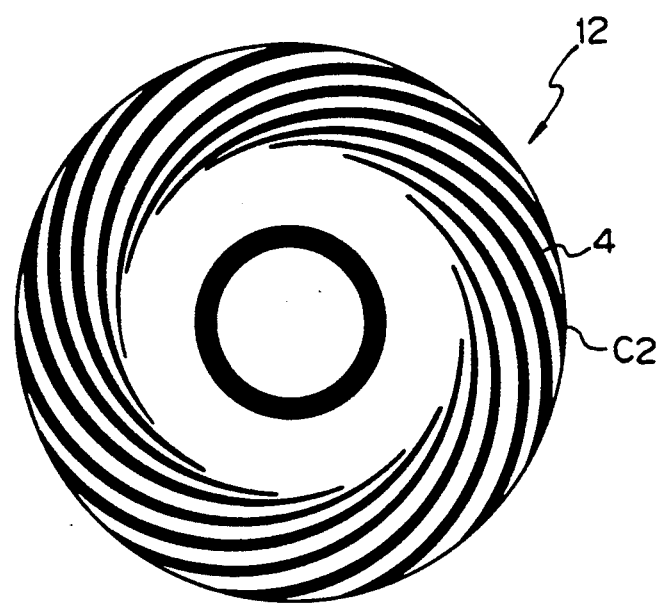
FIG. 7 exemplarily shows dynamic pressure generating grooves formed in a thrust bearing member.

An annular thrust bearing 13 is a spiral groove bearing that is arranged as shown in FIG. 7. A radial bearing member 8 is a herringbone groove bearing member. The inner surface of the motor rotor 6 and the annular radial bearing member 8 constitute in combination a radial bearing such as that shown in FIG. 6.

Herringbone shaped grooves for generating dynamic pressure are usually formed in the surface of the radial bearing member 8, and spiral grooves for generating dynamic pressure are usually formed in a thrust bearing pad 4. However, it should be noted that herringbone-shaped grooves may be formed in the inner surface of the motor rotor 6 that faces the annular radial bearing member 8, with the outer peripheral surface of the radial bearing member 8 being smooth, and that spiral grooves may be formed in the surface of the thrust bearing collar 9 that faces the thrust bearing pad 4, with the surface of the bearing pad 4 being smooth.

Figure 2A:
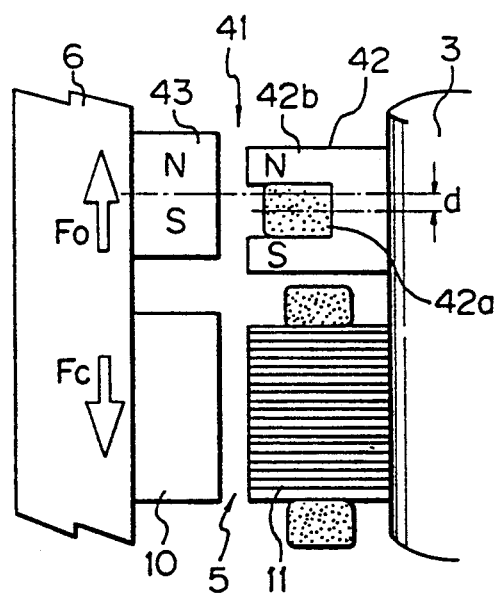
FIGS. 2(a) and 2(b) show the structures of two examples of a load adjusting device.
Figure 2B:
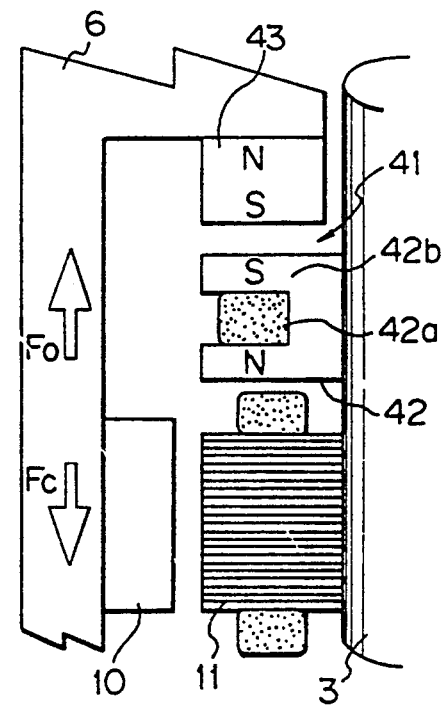

Above a driving motor 5 is provided a thrust load adjusting device 41 for adjusting the load in the thrust direction. The load adjusting device 41 comprises an electromagnet 42 that is secured to the support shaft 3 and a permanent magnet 43 that is secured to the inner surface of the motor rotor 6 in opposing relation to the electromagnet 42. FIGS. 2(a) and 2(b) are enlarged views of two examples of the load adjusting device 41.

In the load adjusting device 41 shown in FIG. 2(a), the electromagnet 42 is disposed in such a manner that the center thereof is closer to the thrust bearing 13 than the center of the permanent magnet 43 by a distance d. The figure shows a state where the coil 42a is energized so that the polarity of the electromagnet 42 is the same as that of the permanent magnet 43.

In the load adjusting device 41 shown in FIG. 2(b), the electromagnet 42 and the permanent magnet 43 face each other in the axial direction. The figure shows a state where the coil 42a is energized so that the polarity of the electromagnet 42 becomes opposite to that of the permanent magnet 43.

In either of the load adjusting devices 41 shown in FIGS. 2(a) and 2(b), when the coil 42a of the electromagnet 42 is not energized, the core 42b of the electromagnet 42 is attracted by the attraction force from the permanent magnet 43, so that the motor rotor 6 is pushed down relative to the motor stator 1, causing a contact pressure Fc to act on the thrust bearing 13. In other words, the thrust bearing collar 9 is pressed against the thrust bearing pad 4 with the contact pressure Fc. When the coil 42a of the electromagnet 42 is energized, the electromagnet 42 and the permanent magnet 43 repel each other, causing a force Fo to act in a direction in which the contact load on the thrust bearing 13 is reduced. Accordingly, the load that is applied to the thrust bearing 13 can be adjusted to a proper value by controlling the value of current supplied to the coil 42a of the electromagnet 42.

If the energization of the coil 42a is suspended or the direction of the current supplied thereto is changed to reverse the polarity of the electromagnet 42, an attraction force acts between the electromagnet 42 and the permanent magnet 43 so that the load applied to the thrust bearing 13 can be increased. Accordingly, in a case where, as the number of revolutions of the spindle motor increases, the thickness of the fluid layer that generates dynamic pressure in the thrust bearing 12 increases excessively and makes the rotation unstable, it is possible to prevent the rotation from becoming unstable by controlling the current that is supplied to the coil 42a of the electromagnet 42 (or reversing the polarity).

Figure 3:
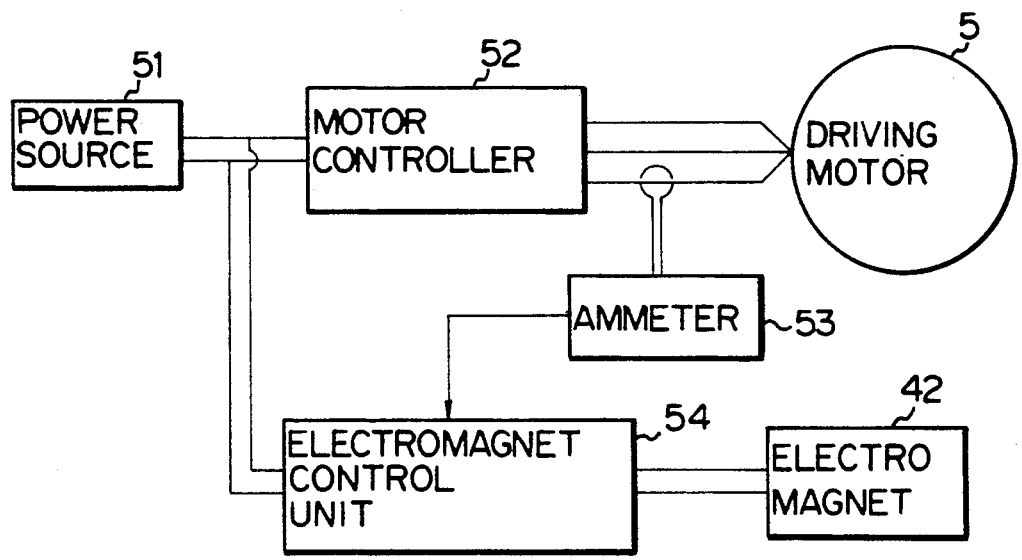
FIG. 3 is a block diagram showing the arrangement of a controller for the spindle motor according to the present invention.

A method of controlling the load adjusting device 41 having the above-described arrangement will be explained below with reference to FIGS. 3 and 4. FIG. 3 is a block diagram showing the arrangement of a controller for the spindle motor of the present invention, and FIG. 4 is a chart showing the control timing.

Referring to FIG. 3, the driving motor 5 of the spindle motor is supplied with driving current through a motor controller 52. The driving current is detected by an ammeter 53, and the output of the ammeter 53 is supplied to an electromagnet control unit 54. The control unit 54 controls the current supplied to the electromagnet 42 on the basis of the current value that is detected by the ammeter 53. Reference numeral 51 denotes a power source.

Figure 4:
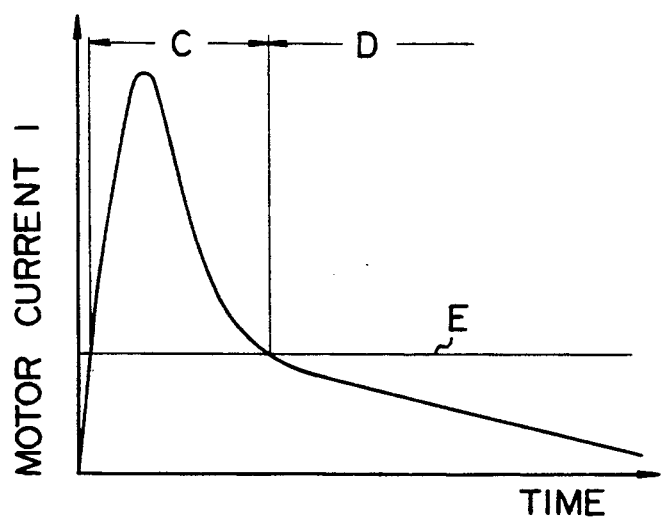
FIG. 4 is a chart showing control timing.

The current I that is supplied to the driving motor 5 of the spindle motor is large at the time of starting and decreases after the starting, as shown in FIG. 4. The current I is detected by the ammeter 53 and the output of the ammeter 53, is input to the electromagnet control unit 54, as stated above. When the motor current I is above a predetermined current value E, the electromagnet control unit 54 supplies current to the electromagnet 42, whereas, when the motor current is not greater than the current value E, the control unit 54 suspends the energization of the electromagnet 42. Accordingly, during a period C where the driving motor 5 is being started and the current value I exceeds the current value E, the current is supplied to the electromagnet 42, whereas, when the current value I becomes not greater than the current value E, the energization of the electromagnet 42 is suspended.

Thus, the load adjusting device 41 is controlled by the electromagnet control unit 54 as follows. In the case of the load adjusting device 41 having the structure shown in FIG. 2(a), during the period C the electromagnet 42 is energized so that the electromagnet 42 has the same polarity as that of the permanent magnet 43. Accordingly, the attraction force that acts between the electromagnet 42 and the permanent magnet 43 increases, so that force Fo is generated to reduce the thrust load acting on the thrust bearing 12, thus reducing the starting torque at the time when the driving motor 5 is started and rotated at low speed. When the number of revolutions of the driving motor 5 increases and the motor current I decreases to a level below the current value E, the energization of the electromagnet 42 is suspended, and a large thrust load is applied by the attraction force from the permanent magnet 43 and the overall weight of the motor rotor 6 and other members.

In the case of the load adjusting device 41 having the structure shown in FIG. 2(b), during the period C the electromagnet 42 is energized so that the polarity of the electromagnet 42 is opposite to that of the permanent magnet 43. Accordingly, the electromagnet 42 and the permanent magnet 43 repel each other to apply force Fo that reduces the thrust load acting on the thrust bearing 12, thus reducing the starting torque at the time when the driving motor 5 is started and rotated at low speed. When the number of revolutions of the driving motor 5 increases and the motor current I decreases to a level below the current value E, the energization of the electromagnet 42 is suspended. Thus, the repelling force between the electromagnet 42 and the permanent magnet 43 is lost, and the thrust load acting on the thrust bearing 12 increases.

Although the above-described electromagnet control unit 54 is arranged to control the supply of current to the electromagnet 42 according to whether or not the motor current exceeds a predetermined value, it should be noted that the current supplied to the electromagnet 42 may be turned on or off in accordance with a change in the gradient of the motor current curve. It is also possible to turn on or off the current supplied to the electromagnet 42 according to whether or not the number of revolutions of the driving motor 5 exceeds a predetermined value by detecting it with a rotational speed sensor or the like.

In addition, the spiral groove hydrodynamic bearing is enabled to exhibit considerably high rotational rigidity by increasing the load-carrying capacity and the preload. More specifically, the rotational rigidity can be enhanced by suspending the energization of the electromagnet 42 or reversing the polarity of the electromagnet 42 after the starting of the driving motor 5 to thereby increase the load on the hydrodynamic bearing.

The spindle motor of the present invention provides the following advantageous effects:

(1) The thrust load adjusting device enables a reduction in the starting torque of the spiral groove hydrodynamic bearing. Accordingly, it is unnecessary to increase the capacity of the driving motor of the spindle motor in consideration of the starting torque.

(2) Since the driving torque is reduced by the thrust load adjusting device, a thrust bearing with a large load-carrying capacity can be used without taking care of the starting torque. In addition, since the thrust load adjusting device enables a large preload to be applied to the hydrodynamic thrust bearing so as to increase the bearing rigidity, stable running can be attained.

(3) Since solid contact between the constituent elements of the thrust bearing can be avoided at the time of starting, the lifetime of the bearing lengthens.

(4) Since the hydrodynamic thrust bearing can be effectively held in position by the operation of the thrust load adjusting device, the spindle motor can be used in a horizontal position.

What is claimed is:

1. A spindle motor, comprising:
   a motor stator;
   a motor rotor;
   a driving motor having a stator secured to said motor stator and a rotor secured to said motor rotor;
   a thrust bearing and a radial bearing rotatably supporting said motor rotor on said motor stator, at least said thrust bearing being a hydrodynamic bearing; and
   a thrust load adjusting means having an electromagnet on said motor stator and a permanent magnet disposed on said motor rotor in opposing relation to said electromagnet for adjusting the thrust load applied to said thrust bearing by controlling the current supplied to said electromagnet so as to control both a repelling force and an attraction force between said electromagnet and said permanent magnet such that the thrust load applied to said thrust bearing is reduced during starting of said driving motor and such that the thrust load applied to said thrust bearing is increased when the rotational speed of said driving motor undergoes a predetermined increase.

2. The spindle motor of claim 1, wherein said thrust load adjusting means supplies current to said electromagnet in accordance with the current supplied to said driving motor.

3. The spindle motor of claim 1, wherein said thrust load adjusting means reverses the polarity of said electromagnet to increase the amount of force applied to said thrust bearing when the rotational speed of said driving motor undergoes said predetermined increase.

4. The spindle motor of claim 1, wherein said thrust load adjusting means comprising a motor controller connected to a power source and to said driving motor controlling the driving current supplied to said driving motor, an ammeter detecting the driving current and an electromagnet control unit receiving an output from said ammeter and controlling the amount of current supplied to said electromagnet.

5. A spindle motor, comprising:
   a motor stator;
   a motor rotor;
   a driving motor having a stator secured to said motor stator and a rotor secured to said motor rotor;
   a thrust bearing and a radial bearing rotatably supporting said motor rotor on said motor stator, at least said thrust bearing being a hydrodynamic bearing; and
   a thrust load adjusting means for adjusting the thrust load applied to said thrust bearing by applying forces on said motor in directions both toward and away from said thrust bearing to increase and decrease the amount of force applied to said thrust bearing under varying conditions of operation of said motor such that the thrust load applied to said thrust bearing is reduced during starting of said driving motor and such that the thrust load applied to said thrust bearing is increased when the rotational speed of said driving motor undergoes a predetermined increase, said thrust load adjusting means comprising an electromagnet on said motor stator and a permanent magnet disposed on said motor rotor.

6. The spindle motor of claim 5, wherein said thrust load adjusting means supplies current to said electromagnet to repel said permanent magnet of said motor rotor and decrease the amount of force applied to said thrust bearing during starting of said driving motor.

7. The spindle motor of claim 6, wherein during the starting of said driving motor the amount of current supplied to said driving motor is above a predetermined level.

8. The spindle motor of claim 5, wherein said thrust load adjusting means supplies current to said electromagnet in accordance with the current supplied to said driving motor.

9. The spindle motor of claim 5, wherein said thrust load adjusting means comprising a motor controller connected to a power source and to said driving motor controlling the driving current supplied to said driving motor, an ammeter detecting the driving current and an electromagnet control unit receiving an output from said ammeter and controlling the amount of current supplied to said electromagnet.

* * * * *